Nov. 15, 1932.  M. H. SIEGEL  1,887,950

INTERCHANGEABLE UMBRELLA HANDLE

Filed July 6, 1932

Inventor

Milton H. Siegel

By Jacobi & Jacobi

Attorneys

Patented Nov. 15, 1932

1,887,950

UNITED STATES PATENT OFFICE

MILTON H. SIEGEL, OF BALTIMORE, MARYLAND, ASSIGNOR TO SIEGEL, ROTHSCHILD-GANS BROS., INC., OF BALTIMORE, MARYLAND

INTERCHANGEABLE UMBRELLA HANDLE

Application filed July 6, 1932. Serial No. 621,128.

This invention relates to an interchangeable handle and it consists in the novel features hereinafter described and claimed.

An object of the invention is to provide an umbrella having the usual wood staff with a threaded sleeve embedded in the end of the staff and also to provide a handle having at one end a socket adapted to receive the end of the staff and provided with a pin located centrally within the said socket, the said pin being adapted to engage into the sleeve or collar carried by the staff.

A prime object of the invention is to provide means whereby the handle may be easily and quickly detached from the umbrella staff and any other handle of similar structure but of different design may be substituted in place of the original handle, if desired.

A further object of the invention is to provide the staff of an umbrella with handle holding means and to provide handles with means adapted to engage the said holding means, whereby any particular handle may be easily and quickly connected with the staff of the umbrella.

Figure 1:
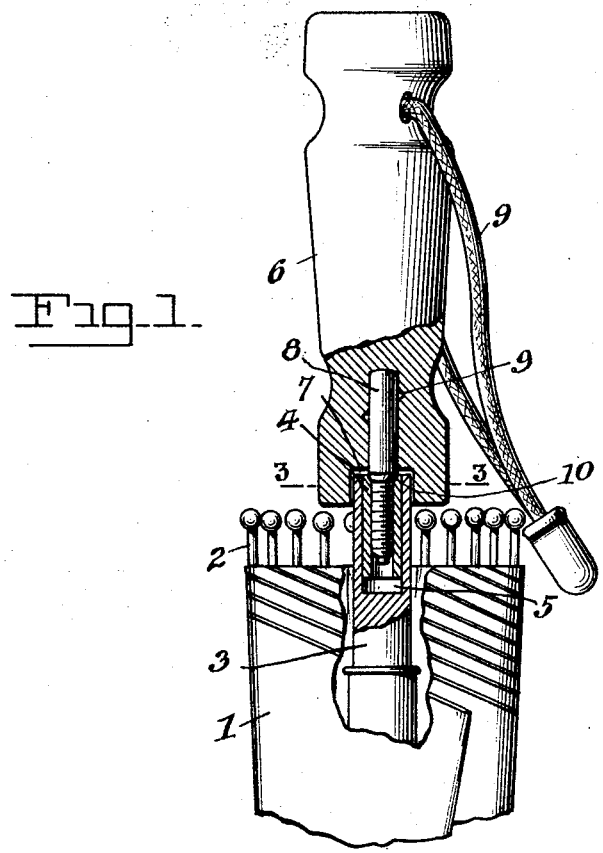
Figure 1 is a fragmentary side elevational view of an umbrella showing a handle attached to the staff thereof and illustrating parts broken away and parts shown in section.
Figure 3:
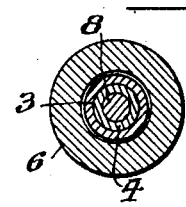
Figure 3 is a transverse sectional view of the structure cut on the line 3—3 of Figure 1.
Figure 2:
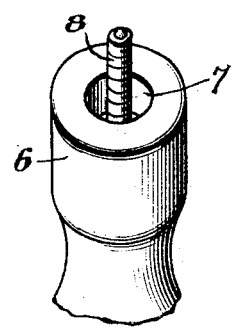
Figure 2 is a fragmentary perspective view of one end portion of the handle.

As illustrated in the accompanying drawing, the umbrella includes the usual cover 1 mounted upon ribs 2 and having a handle staff 3. The handle staff 3 carries at one end a collar 4 which fits snugly within a socket 5 provided in the end of the staff. The said collar is internally screw-threaded and the outer end edge of the collar is flush with the end of the staff.

A handle 6 is provided at one end with a socket 7 and a pin 8 is fixed in the end portion of the handle and is concentrically arranged within the socket 7. The end of the pin 8 is threaded and projects beyond the end of the handle. The handle is provided with a cord 9.

When the pin 8 is screwed into the collar 4, the end portion of the staff 3 is drawn into the socket 7 of the handle whereby the handle is securely attached or fixed with relation to the staff. Should it be desired, the handle 6 may be detached from the staff and another handle of similar structure may be connected with the staff, as hereinafter described. The handles may be of different designs and may be ornamented in different patterns to suit the taste of the person who uses the umbrella. The pin 8 is provided with spurs 9 which engage in the handle 6 and securely hold the parts together. The pin 9 is further provided with a bevelled surface 10 which snugly fits against the bevelled peripheral upper edge of the collar 4.

From the foregoing description, it will be seen that an umbrella structure of simple design is provided and that any particular handle may be easily and quickly connected with the staff of the umbrella or disconnected therefrom and that the parts and features are so arranged and assembled as to securely hold the handle in position at the end of the staff when applied thereto.

From the foregoing, it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. An umbrella staff provided at its end with a socket, an internally threaded collar housed in the socket, a handle provided at its end with a socket adapted to receive the end portion of the staff and a threaded pin carried by the handle and concentrically positioned with relation to the socket thereof and adapted to engage said collar.

2. An umbrella staff provided at its end with a socket, a collar housed in the socket and having its end flush with the end of the staff, a handle provided at its end with a socket adapted to receive the end portion of the staff and a pin carried by the handle and concentrically positioned with relation to the socket thereof and adapted to engage in the collar.

3. An umbrella staff provided at its end with a socket, an internally threaded collar housed in the socket and having its end flush with the end of the staff, a handle provided at its end with a socket adapted to receive the end of the staff, a threaded pin carried by the handle and disposed concentrically with relation to the socket thereof, said pin having an end portion extending beyond the end of the handle and adapted to engage in the collar.

4. In a device of the class described, the combination with an umbrella staff provided at its upper end with a socket, an elongated internally threaded collar housed in said socket and having its upper peripheral edge flush with the upper peripheral edge of said staff, said upper peripheral edge of the collar being bevelled; of a handle provided at its inner end with a short socket for the reception therein of the upper end portion of said staff and collar, a pin secured axially of said handle and having a reduced threaded portion projecting through the socket in said handle and beyond the end of the latter for engagement with the threads of said collar, that portion of said pin forming the junction between the threaded and unthreaded portions thereof being bevelled and disposed just beyond the base of the socket in said handle and adapted for contact with the bevelled upper peripheral edge of said collar, whereby to frictionally bind the ends of the elements together and prevent casual disengagement of the handle member from the staff.

In testimony whereof, I affix my signature.

MILTON H. SIEGEL.